United States Patent [19] [11] Patent Number: 4,964,730
Alzner et al. [45] Date of Patent: Oct. 23, 1990

[54] PLASTICATING EXTRUDER SCREW

[76] Inventors: Bernard G. Alzner, 41 E. North Ave., Lake Forest, Ill. 60045; Desider G. Csongor, 19 Bennet St., Manchester, Mass. 01944

[21] Appl. No.: 212,163

[22] Filed: Jun. 24, 1988

Related U.S. Application Data

[63] Continuation of Ser. No. 897,987, Aug. 19, 1986, abandoned.

[51] Int. Cl.⁵ .............................................. B29B 7/40
[52] U.S. Cl. ...................................... 366/81; 425/208
[58] Field of Search .................. 366/76, 79, 81, 80, 366/88, 89, 90, 150, 181, 322, 323; 264/211.21, 211.23, 349, 176.1; 425/133.1, 200, 204, 205, 207, 208, 209, 376.1, 382.3, 382.4

[56] References Cited

U.S. PATENT DOCUMENTS

| | | | |
|---|---|---|---|
| 3,023,456 | 3/1962 | Palfey | 425/208 |
| 3,271,819 | 9/1966 | Lacher | 366/89 |
| 3,375,549 | 4/1968 | Geyer | 366/83 |
| 3,504,400 | 4/1970 | Natov et al. | 198/661 |
| 3,698,541 | 10/1972 | Barr | 366/343 |
| 3,701,512 | 11/1972 | Schippers et al. | 366/81 |
| 3,713,627 | 1/1973 | Skobel . | |
| 3,858,856 | 1/1975 | Hsu | 366/88 |
| 3,866,890 | 2/1975 | Tadmor et al. | 366/76 |
| 3,868,093 | 2/1975 | Sokolow | 366/89 |
| 3,912,241 | 10/1975 | Oestreich . | |
| 4,000,884 | 1/1977 | Chung | 366/88 |
| 4,006,209 | 2/1977 | Chiselko et al. | 264/349 |
| 4,015,832 | 4/1977 | Kruder | 366/76 |
| 4,054,403 | 10/1977 | Hornbeck et al. | 425/208 |
| 4,252,755 | 2/1981 | Normanton et al. | 425/208 |
| 4,595,546 | 6/1986 | Wheeler, Jr. | 425/208 |

FOREIGN PATENT DOCUMENTS

| | | |
|---|---|---|
| 0034505 | 8/1981 | European Pat. Off. . |
| 1909009 | 9/1970 | Fed. Rep. of Germany . |
| 3311176 | 10/1984 | Fed. Rep. of Germany . |
| 3501851 | 8/1985 | Fed. Rep. of Germany . |
| 46-10308 | 3/1971 | Japan ...................................... 366/79 |
| 51-31823 | 9/1976 | Japan ...................................... 425/208 |
| 86/06325 | 11/1986 | PCT Int'l Appl. ................... 366/79 |
| 2028218 | 3/1980 | United Kingdom . |
| 1590381 | 6/1981 | United Kingdom . |

OTHER PUBLICATIONS

Patent Abstracts of Japan, vol. 7, No. 12 (M-186) (1157), 19 Jan. 1983, & JP, A, 57169337 (Nippon Seikosho K.K.) 28 Jun. 1983.
Patent Abstracts of Japan, vol. 7, No. 215 (M-244) (1360), 22 Sep. 1983, & JP, A, 58108118 (Nippon Seikosho K.K.) 28 Jun. 1983.

Primary Examiner—Jill L. Heitbrink
Attorney, Agent, or Firm—Hamilton, Brook, Smith & Reynolds

[57] ABSTRACT

A plasticating extruder screw incorporates two or more screw configurations into a single screw. This is accomplished with two or more parallel channels in which each channel is designed to a different set of materials and performance requirements reflecting the range of the materials to be processed. The extrusion screw in fact represents two or more screws in a single screw in which each performs its function independently of the other. Thus, each channel in this screw differs from the others in critical design parameters such as compression ratio, length and depth of its feed, transition and metering zones. This multiconfigurational design feature may occupy part or the entire length of the extruder as dictated by the specific characteristics of the materials to be processed. A mixing and stabilization zone placed at or near the entrance of the metering zone of the screw provides for melt flow interaction and equilibration between channels. The screw terminates in a metering zone comprised of one or more channels designed in accordance with known principles.

14 Claims, 2 Drawing Sheets

CHAN NO. 2 ----
CHAN NO. 1 ——

FIG. 2C  COMPRESS RATIO AT XX: CHANNEL 1: 2.8; CHANNEL 2: 2.0

| ZONE | FEED | TRANSITION | 1ST METER | MIXING | FINAL METER | | PUMP |
|---|---|---|---|---|---|---|---|
| | | | | | FEED | TRANS | |
| CHAN. I: L1 | 1.5 | 1.5 | 1.5 | — | — | — | — |
| – NO. TURNS | 3 | 9 | 2 | 2 | — | — | — |
| – DEPTH | 0.45 | — | 0.160 | — | — | — | — |
| CHAN. II: L2 | 1.5 | 1.5 | 1.5 | — | 1.5 | 1.5 | 1.5 |
| – NO. TURNS | 6 | 7 | 1 | — | 1 | 2 | 5 |
| – DEPTH | 0.30 | — | 0.145 | — | 0.220 | — | 0.150 |

PLASTICATING EXTRUDER SCREW

This is a continuation of co-pending application Ser. No. 897,987 filed on Aug. 19, 1986 now abandoned.

BACKGROUND OF THE INVENTION

Extrusion screws featuring two or more parallel channels are among the first types of screws used in the trade. These screws, in which all channels within a given screw are of identical configuration, usually of relatively low compression ratio as measured by the ratio of feed to meter channel depth. These types of screws were replaced by the single channel screw which was found to be more effective than the multichannel screw described above. Increasing emphasis was placed on optimization of the single channel screw with the aid of computer programs as these became available. While these developments produced considerable performance improvements they, nevertheless, failed to cope with the variability in materials and process encountered in the trade.

The last decade witnessed the appearance of several unique types of extrusion screws intended to overcome the variability problems described. The most noteworthy of these developments is the barrier screw. While many variations of the basic barrier concept were produced, they all feature a nonparallel minor flight in the transition, i.e. melting, zone whose purpose is to separate the solid from the melt where these two phases coexist. It accomplishes this by allowing the melt to pass over the minor flight which is of a lesser height than the major flight while containing the solid pellets in the original channel. The minor flight is faced out at the calculated point of complete conversion of solid to melt. This condition is only realized when design parameters are satisfied which is rarely the case in practice.

SUMMARY OF THE INVENTION

In accordance with the present invention, an extruder plasticizing screw comprises two or more parallel channels defined by parallel flights. Each channel is of unique configuration relative to width, depth and/or length of its functional feed transition and/or metering zones. Each channel is designed to a different set of material characteristics in order to extend the range of materials which can be handled by the screw. The output of the two channels is mixed in a mixer which may be incorporated onto the screw. The flights defining the channels provide minimal clearance to minimize interference between the channels prior to mixing.

Preferably, the melt emerging from the channels is pooled in a single channel. The single channel has a cross-sectional area adjacent to the exit end of the multichanneled section at least 20 percent greater than the cross-sectional area of the discharge end of the multichanneled section.

DESCRIPTION OF THE PREFERRED EMBODIMENT

The screw is the heart of any extruder. It performs all of the essential functions of the extruder which include solids conveying and compacting, melting, mixing and homogenization of the melt, and pumping which it must do at a consistent rate. Failure in any one of these functions will adversely affect the others. Optimum performance of these functions is achieved through the development of a screw configuration dictated by specific materials and performance characteristics. The polymeric material processed by such extruders is usually supplied in pellet, powder or granular form. It is well known in the art that these materials differ widely in their processing characteristics. In fact, lot to lot variations within a specific type or brand of polymer from a single source is not uncommon. The use of scrap necessitated by economic considerations further aggregates variability in the feed stock as dissimilar particles exhibit different processing characteristics. This can cause destabilization in the feed and melting zones which usually remain uncorrected in the metering zone. It is a common practice among convertors to resort to the use of several screws to effectively cope with such material variability.

It is the objective of this invention to provide a multiconfigurational screw in a single screw which has a broader useful operating range than is obtainable with a single configuration. This is accomplished by incorporating two or more parallel channels in critical portions of the screw in which each channel is optimized to a different set of materials and performance characteristics reflecting the variability encountered in the material to be processed. The flights separating the channels are designed to a minimum clearance so that each channel functions with the minimum interference from adjacent channels. Each channel thus formed differs from the other in important design parameters such as compression ratio, length and depth of its zones particularly its feed and transition zones. Each channel is designed for optimum performance to different materials and performance requirements dictated by variations encountered in the material and process. Problems developed in one channel will be compensated for in the other with the configuration better matched to the material processed. A mixing and flow stabilization zone placed in the metering zone near the end of the multiconfigurational section of the screw insures equilibration and stabilization of the melt quality and flow.

Figure 1:
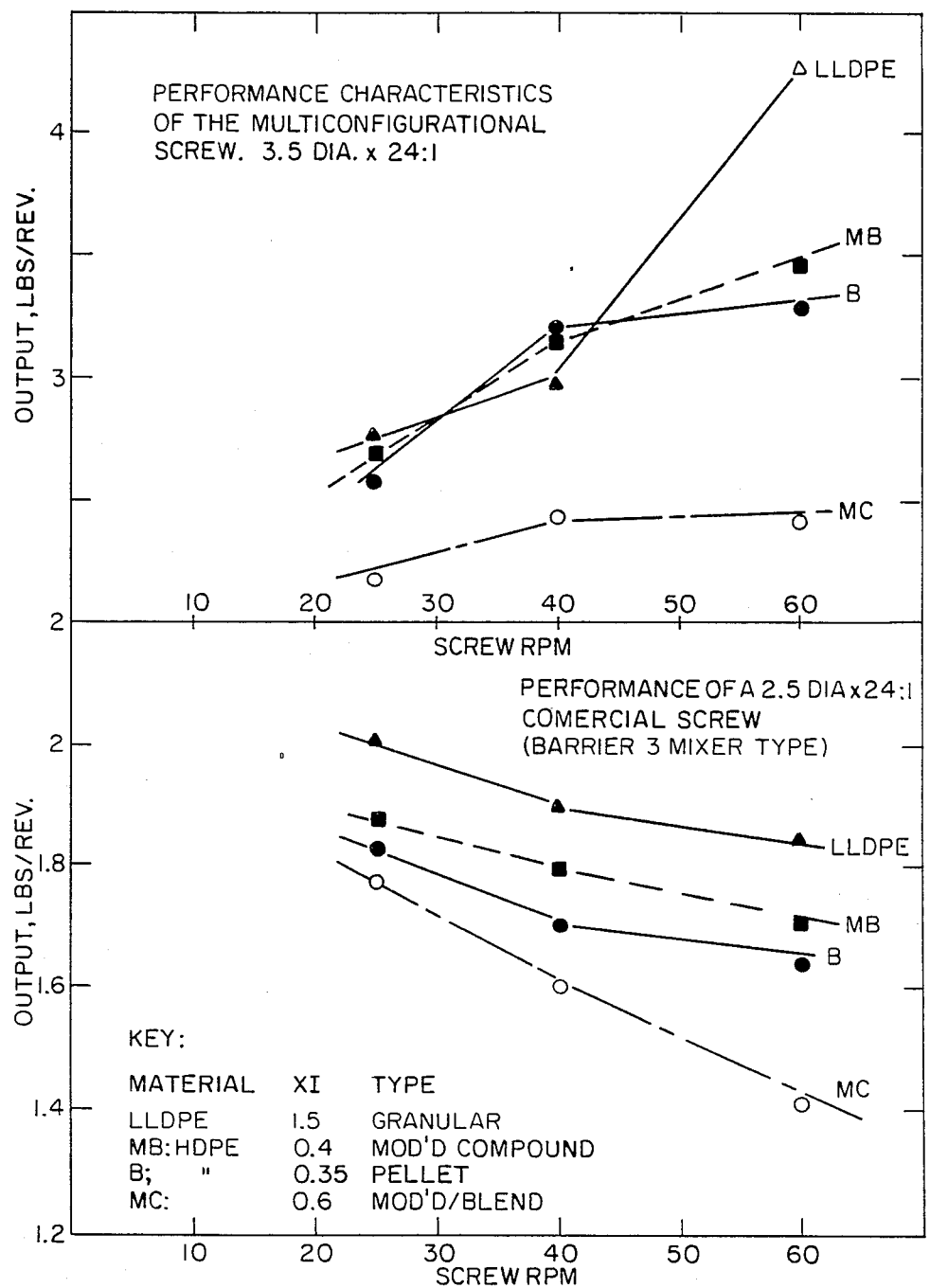
FIG. 1 illustrates the performance characteristics of a screw embodying the present invention and of a commercially available barrier mixer type of screw.

The multiconfigurational screw of the invention was found to exhibit a broader operating range than is obtained with single channel screws and other types known in the trade. Performance characteristics of such a screw are depicted for a number of difficult to process polymers in FIG. 1. A similar performance study performed on a screw enjoying wide customer acceptance in the trade is depicted in FIG. 1. While the commercial screw of FIG. 1B exhibits a decline in its pumping efficiency with increasing output, i.e. RPM as measured by its displacement in pounds per revolution, the screw of this invention exhibited constant and, in some cases, improved pumping efficiency with increasing RPM. This result is particularly surprising in the case of the high density polyethylene, both of which are known for their poor processing characteristics. The other surprising fact revealed in this study is the wide range of dissimilar materials so effectively processed in the screw of this invention.

Another less obvious benefit attributable to high pumping efficiency is the reduction in shear energy per pound of material processed which should be kept to a minimum with most polymers.

Still another advantage observed with the type of screw described herein is in the dimensional consistency of the extrudate as measured by the mean and standard deviation data shown below in comparison to a standard. Accordingly, the screw of the subject invention exhibits less fluctuations and greater tolerance for materials related variables than the standard used in these tests. The standard is a barrier type screw which enjoys considerable popularity in the trade.

Variations in film thickness at 60 screw RPM observed with the commercial and multiconfigurational screws

| MATERIAL | MI | COM. (STD) SCREW | | MULTICON-FIGURATIONAL | |
|---|---|---|---|---|---|
| | | GA (mils) | STD.D | GA (mils) | STD.D |
| HDPE 'A' | 0.4 | 4.1 | 0.7 | 4.2 | 0.3 |
| HDPE 'B' | 0.6 | 4.8 | 0.5 | 4.7 | 0.2 |
| LLDPE | 1.5 | 4.5 | 0.9 | 4.6 | 0.6 |
| Modified 'A' | 0.7 | 4.3 | 0.4 | 4.4 | 0.4 |

Figure 2A:
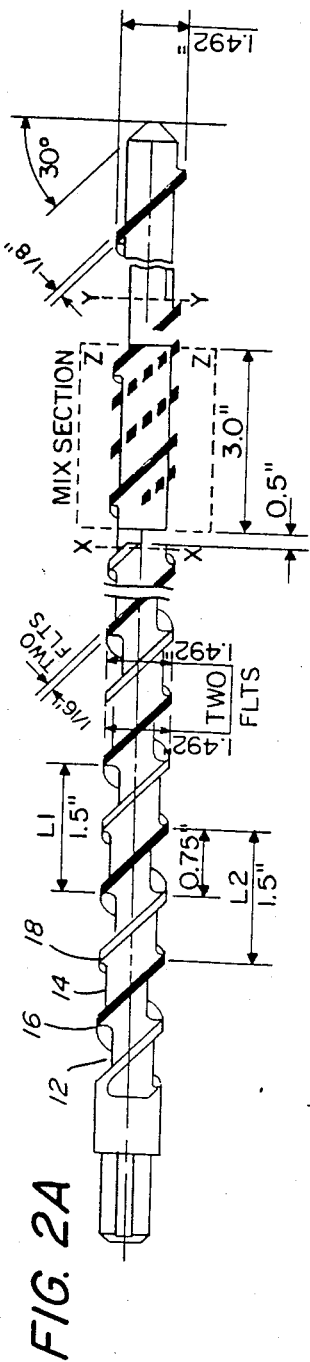
FIG. 2A is a side view, not to scale and broken of a screw embodying the present invention.
Figure 2B:
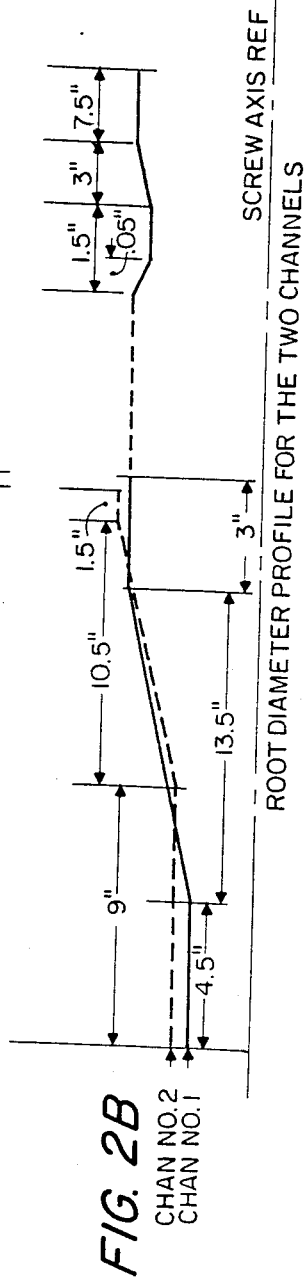
FIG. 2B is the root diameter profile of the screw, and FIG. 2C sets forth design parameters of an alternate screw.

MI - melt index; COM. (STD.) - Commercial (Standard);
GA - gauge;
STD.D - Standard Deviation The essential design features of alternative embodiments of the extrusion screw described above are detailed in FIG. 2. Accordingly, said screw contains two or more parallel channels 12 and 14 separated by parallel flights 16 and 18 in the feed zone and at least in 50% of the transition zone. As indicated in FIG. 2A, the two flights have the same outer diameter. It is essential that each channel in this section of the screw is designed to a different set of design parameters defining the range of variability encountered with the materials to be processed. In this example the configurational differences were developed for optimum solid conveying and melting of polymeric material differing in bulk density as is the case with the inclusion of reclaimed scrap in virgin resin at varying concentrations. The resulting channels exhibit significant configurational differences in the feed, transition and metering zones as illustrated in FIG. 2B and 2C.

The lengths L1 and L2 between common points on each flight remain constant for both flights at 1.5 inches. The depths of the channels vary differently as illustrated by the broken and solid lines of FIG. 2B illustrating one embodiment and the dimensions set forth in FIG. 2C illustrating another embodiment. The first channel has a compression ratio at XX of 2.8, and the second channel has a compression ratio of 2.0. Both flights have the same outer diameter of 1.492.

An important element in these screws consists of a mixing and stabilization (ZZ to YY) zone placed at or near the end of the multichanneled section. Any mixing configuration known in the art may perform adequately. In its simplest form, this zone may be comprised of a single channel having a melt volume cross-sectional area at YY at least 20 percent greater than the combined cross-sectional areas of the preceding multichannelled section at XX. Melt mixing and stabilization is further enhanced by a complete interruption of the flights for a short interval, i.e. 0.25 to approximately 1, at the entrance of the decompression point, YY, preferably between the mixing and the decompression sections, i.e. at ZZ on the drawing. The sequence of mixers, interrupted flight portion and decompression channel comprising an effective melt mixing and flow stabilization zone. The screw is terminated at the discharge end by a single or multichanneled metering section designed in accordance to known principles of extrusion.

We claim:

1. An extruder plasticating screw for processing material input at a single input comprised of two or more parallel channels in a multichannelled section, each channel receiving material from the single input, each channel defined by parallel flights having the same outer diameter extending through a substantial portion of a transition zone, the channels being of different independent transition zone configurations, each channel having an increase in root diameter, the increases in root diameter of the channels being different in each channel, the material output from the channels being combined and mixed.

2. An extrusion screw as claimed in claim 1 in which the feed zone and at least 50% of the transition zone is comprised of the two or more parallel channels.

3. An extrusion screw as claimed in claim 1 in which each channel is configured for optimization relative to a different set of plasticized materials characteristics.

4. An extrusion screw as claimed in claim 1 in which each channel is configured for optimization relative to a different set of process requirements.

5. An extrusion screw as claimed in claim 1 in which each channel differs from the other in at least one of several dimensional characteristics including width, depth or length of its functional zones which include the feed, transition, and metering zones.

6. An extrusion screw as claimed in claim 1 in which melt emerging from the two or more channels is combined in a single channel.

7. A screw as claimed in claim 6 in which the single channel has a cross sectional area adjacent to an exit end of the multichannelled section at least 20% greater than the combined cross sectional area of the two or more channels at the exit end of the multichannelled section.

8. A screw as claimed in claim 7 which has a melt mixing and stabilizing zone comprised of a mixing section in which the melt emerging from the two or more channels is combined and mixed.

9. An extrusion screw as claimed in claim 8 wherein the melt mixing and stabilizing zone comprises the mixing section followed by a decompression channel in which channel flights are completely interrupted for a short interval between the mixing section and decompression channel, said interval being about 0.25 to 1 inch in length.

10. An extrusion screw as claimed in claim 1 in which the melt emerging from the two or more channels is combined and mixed in a common mixing section.

11. An extrusion screw as claimed in claim 1 which terminates at a discharge end in a single or multichannel metering section.

12. An extrusion screw as claimed in claim 1 wherein each of the two or more parallel channels includes feed, transition and meter zones, the lengths of the zones differing between channels.

13. An extrusion screw as claimed in claim 1 wherein the parallel flights have minimal clearance to minimize interference between channels.

14. An extruder incorporating the screw of claim 1 further comprising means for mixing the outputs of the two channels.

* * * * *